Nov. 15, 1938.  W. G. FRAZIER  2,136,816
CLAM OPENER
Filed Sept. 4, 1937
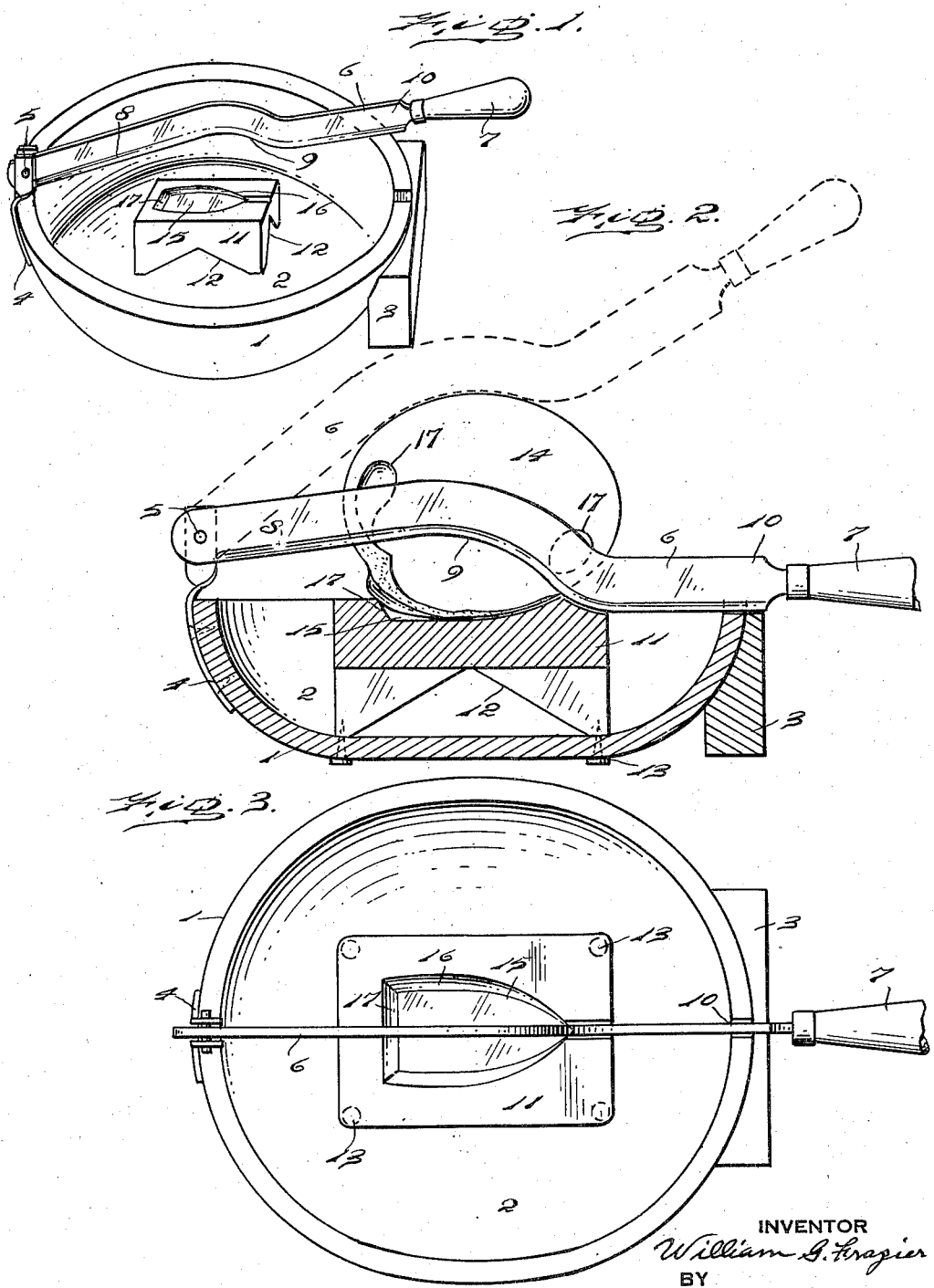
INVENTOR
William G. Frazier
BY
Herbert P. Fairbanks
ATTORNEY Patented Nov. 15, 1938

2,136,816

UNITED STATES PATENT OFFICE 2,136,816

CLAM OPENER

William G. Frazier, Philadelphia, Pa.

Application September 4, 1937, Serial No. 162,412

3 Claims. (Cl. 17—9)

The object of this invention is to devise novel means for opening clams without mutilating them, and in such a manner that all of the juice of the clams is saved.

A further object of my invention is to devise a novel construction and arrangement of a bowl or container having novel means to support a clam, and a novel construction of a knife.

A further object of the invention is to devise a novel clam opener wherein the adductor muscles can be cut without cutting into the body portion or heart of the clam.

With the above and other objects in view, as will hereinafter more clearly appear, my invention comprehends a novel clam opener.

It further comprehends a novel clam opener having a novel chambered base to retain the clam juice, a novel clam support, and a novel knife or blade movably mounted on the base.

Other novel features of construction and advantage will hereinafter more clearly appear in the detailed description and the appended claims.

For the purpose of illustrating the invention, I have shown in the accompanying drawing a typical embodiment of it, which in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a perspective view of a clam opener embodying my invention.

Figure 2 is a sectional elevation.

Figure 3 is a top plan view.

Similar numerals of reference indicate corresponding parts.

Referring to the drawing:

1 designates the base of a clam opener embodying my invention. The shape and contour of the base may vary widely in practice, but for purpose of illustration, I have shown it as bowl shaped to provide a chamber 2 to retain the clam juice. The bowl may have connected with it in any desired manner a block 3 which prevents rocking of the bowl during the opening operation. 4 is a hinge bracket secured to the base to provide a hinge support at 5 for the rear end of a knife or blade 6 which is provided at its opposite end with a grasping handle 7.

The knife 6 has the straight portion 8 which merges into a curved portion 9 which latter merges into the straight portion 10. The base and support can be cut away to provide proper clearance when the knife is moved downwardly.

11 designates a clam support in the form of a block having its sides and bottom cut away as at 12 to form passages for the free flow of the clam juice. This block is secured to the bowl by fastening devices 13. The top face of the block is recessed in a novel manner to form a stable support for a clam 14 to be opened. A recess 15 has a flat bottom, curved, tapering sides 16 and an upwardly inclined rear wall 17.

Assuming now that a clam is to be opened, the knife is raised and a clam placed in the recess 15. The contour of the recess is such that the clam is firmly seated in the recess with the hinged base portion of the shell in the recess and the nose of the clam shell resting on top of the support. The dividing line between the two halves of the shell is in the plane of the path of movement of the knife. The operator now moves the knife downwardly to rest on the shell, and on further downward movement of the knife the two halves at their upper portions are moved away from each other and the adductor muscles 17 are cut through.

Due to the curvature of the knife, the edible part of the clam such as the body portion and heart are not cut into or mutilated.

All of the juice of the clam is retained within the bowl.

By the use of this invention, clams can be rapidly opened, and all of the juice of the clams can be saved.

While I have designated my device as a clam opener, it will be apparent that it can be used for opening other types of bivalves.

It will be seen from Figure 2 that the curvature of the knife preferably conforms substantially to the curvature of the juxtaposed portion of the shell, so that the downward pressure of the knife tends to press the clam towards its seat.

Having thus described my invention, what I claim as new and desire to secure by Letters Patent is:—

1. A clam opener, comprising a base, a clam support carried by the base, and a knife movably mounted and having an outwardly deflected blade portion to clear the body portion and heart of the clam as the knife cuts the adductor muscles of the clam.

2. A clam opener, comprising a base having a juice retaining chamber, a clam support in said chamber, and a knife having one end in hinged relation with said base and having a blade portion with cutting portions to cut the adductor muscles of the clam with the blade portion between said cutting portions of such shape as to provide a clearance for the body portion and heart of the clam to prevent their mutilation by the knife during the opening operation.

3. A clam opener, comprising a base of bowl formation having means to increase the stability thereof, a clam support in said bowl having passages for the flow of the clam juice and having a clam receiving recess in its upper face conforming to the base of a clam shell to retain a clam in an upright position, and a knife having one end in hinged relation with the bowl and the blade portion provided with an outwardly deflected portion to clear the body portion and heart of the clam during the operation of cutting the adductor muscles of the clam being opened.

WILLIAM G. FRAZIER.